United States Patent [19]

Yamamoto

[11] Patent Number: 4,794,371
[45] Date of Patent: Dec. 27, 1988

[54] REMOTE CONTROL APPARATUS

[75] Inventor: Hitoshi Yamamoto, Kawasaki, Japan

[73] Assignee: Fuji Electric Company Ltd., Kanagawa, Japan

[21] Appl. No.: 4,281

[22] Filed: Jan. 6, 1987

Related U.S. Application Data

[63] Continuation of Ser. No. 563,914, Dec. 21, 1983, abandoned.

[30] Foreign Application Priority Data

Dec. 21, 1982 [JP] Japan ................................. 57-225468

[51] Int. Cl.⁴ .............................................. H04Q 1/00
[52] U.S. Cl. ........................... 340/825.64; 340/825.69
[58] Field of Search ....................... 340/825.69, 825.63, 340/825.52, 825.64; 377/107–110, 116; 328/59, 61, 187; 307/271, 265–267, 260, 29, 38, 42, 592; 364/140–146, 492; 370/8, 77, 78; 375/22, 23

[56] References Cited

U.S. PATENT DOCUMENTS

| | | | |
|---|---|---|---|
| 3,990,047 | 11/1976 | Sach et al. | 340/825.63 |
| 4,161,634 | 7/1979 | Bellisio | 340/825.52 |
| 4,161,635 | 7/1979 | Wolaver | 340/825.52 |
| 4,227,181 | 10/1980 | Brittain | 340/825.63 |
| 4,254,460 | 3/1981 | Achter et al. | 364/141 |
| 4,310,801 | 1/1982 | Baker | 377/110 |
| 4,311,986 | 1/1982 | Yee | 340/825.63 |
| 4,495,497 | 1/1985 | Molnár | 340/825.63 |
| 4,519,002 | 5/1985 | Amano | 340/825.63 |

Primary Examiner—Ulysses Weldon
Attorney, Agent, or Firm—Sughrue, Mion, Zinn, Macpeak, and Seas

[57] ABSTRACT

A remote control apparatus in which a plurality of loads, assigned to a plurality of load stations, can be individually addressed via a single signal line without the use of complex multiplexing and demultiplexing circuitry. A pulse generator outputs bursts of pulses of a predetermined width onto a single signal line which interconnects all load stations. Each load in the system corresponds to a single respective one of the pulses of the burst. Each load station includes a switching device for selectively shortening selected ones of the pulses. Each load is activated in dependence upon the width of its corresponding pulse.

4 Claims, 3 Drawing Sheets

REMOTE CONTROL APPARATUS

This is a continuation of application Ser. No. 563,914, filed Dec. 21, 1983 now abandoned.

BACKGROUND OF THE INVENTION

The present invention relates to a remote control apparatus.

In situations where terminal equipment, such as a load, is located at a great distance from central equipment and is remotely controlled therefrom, the number of wires connecting the terminal equipment with the central equipment should be held to a minimum in order to reduce construction and maintenance costs and to improve the reliability of the system. For this purpose, signals heretofore have been multiplexed, which necessitates the provision of multiplexing and demultiplexing devices. Accordingly, the overall system tends to be complex and expensive.

It is accordingly the primary object of the present invention to provide an apparatus which can remotely control any desired load or the like using a single signal line and having a simple structure and without introducing the aforementioned difficulties.

SUMMARY OF THE INVENTION

In accordance with the above and other objects of the invention, there is provided a remote control apparatus including a plurality of load stations, each including one or more addressible loads, and switch means for indicating which loads among all load stations are to be activated. More specifically, the remote control apparatus of the invention includes a pulse generator for producing periodically bursts of pulses separated by silent intervals. These bursts of pulses are transmitted via a single signal line to each of the plural load stations. To activate a designated one of the loads, a corresponding switch of the switch means of any of the load stations is closed. Through the operation of an electronic remote control unit, a corresponding pulse of each burst is shortened. Within the remote control unit of the load station containing the load to be activated, the presence of the shortened pulse is detected and the corresponding load activated.

DESCRIPTION OF THE PREFERRED EMBODIMENTS

Figure 1:
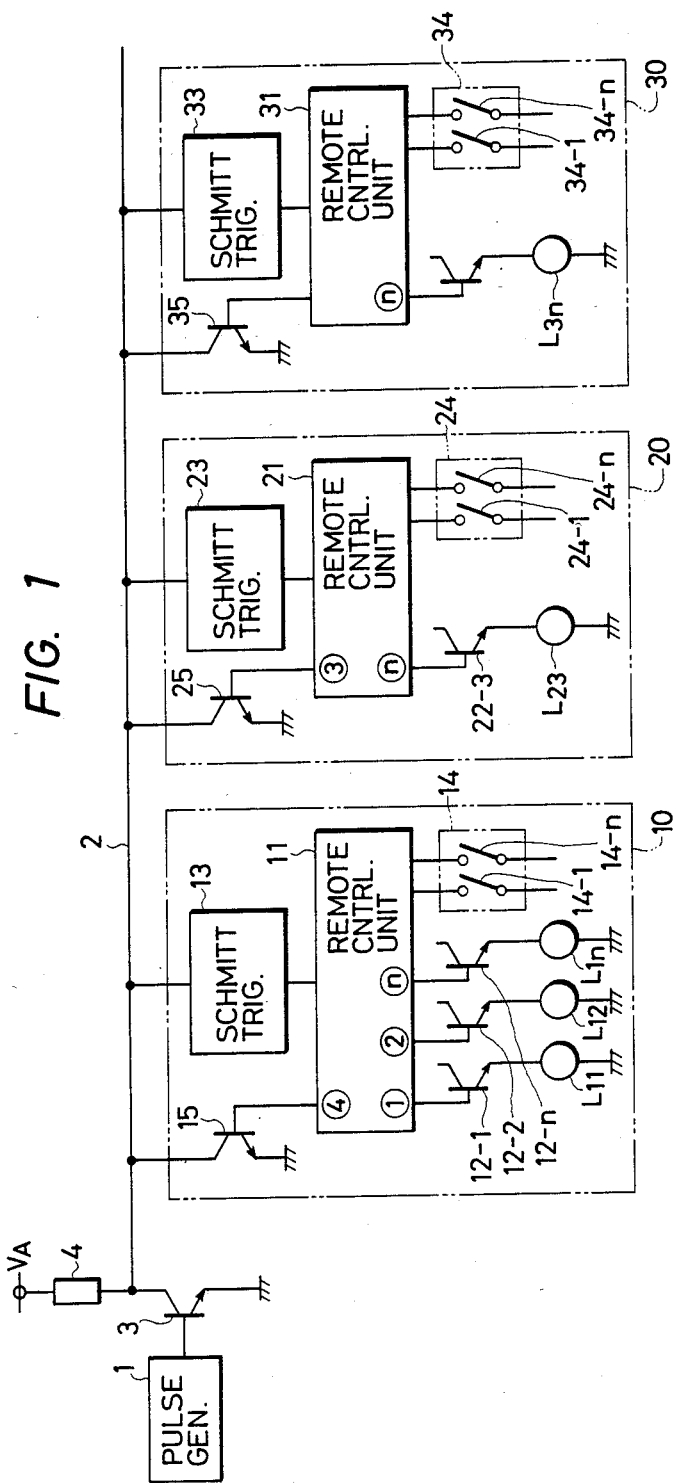
FIG. 1 is a circuit diagram of a preferred embodiment of a remote control apparatus of the present invention.

Referring to FIG. 1, an apparatus embodying the concept of the invention includes a pulse generator 1, a signal line 2 and a transittor 3, the latter being turned on and off by the output signal from the pulse generator 1 to transmit a pulse signal voltage over the signal line 2 connected to the collector of the transistor 3. The collector of the transistor 3 is also connected to a source of a DC potential $V_A$ through a resistor 4.

Figure 2:
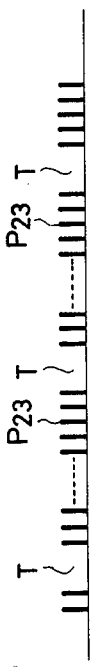
FIG. 2 illustrates examples of pulses used in the embodiment of FIG. 1.

The pulse generator 1 delivers bursts of pulses separated by "silent" periods of duration T, as shown in FIG. 2.

The transistor 3 is turned on or off by these pulses so that a pulsed voltage is transmitted over the signal line 2 accordingly.

The apparatus further includes load station 10, 20 and 30, each of which is equipped with one or more loads $L_{11}$, $L_{12}$, ... $L_{1n}$, $L_{2n}$, $L_{3n}$ etc. The loads may, for example, include lighting apparatuses or air conditioning equipment. The load stations 10, 20 and 30 are equipped with remote control units 11, 21 and 31, respectively, which will be described in detail below. As an example, an output signal appearing at terminal (1) of the control unit 11 switches on or off a transistor switch 12-1 to thus control the flow of current to the load $L_{11}$. The control units 11, 21 and 31 are connected to the signal line 2 through Schmitt trigger circuits 13, 23 and 33, respectively. The Schmitt trigger circuits modify the waveforms of the pulse signals on the line 2.

Appropriate addresses, for instance, 1, 2, ... n, are assigned to the loads $L_{11}$, $L_{12}$, ... $L_{1n}$, $L_{2n}$, $L_{3n}$, ... of each load station. Addresses may be assigned so that each load is related to a specific load station. Alternatively, addresses may be assigned to all the loads in succession independent of the stations.

In the apparatus of the invention, the address of any load to be controlled can be selected at will so that any load can be controlled from any load station. For this purpose, the load stations are equipped with load selecting devices 14, 24 and 34, respectively, which have address selecting switches 14-1 through 14-n, 24-1 through 24-n and 34-1 through 34-n, respectively.

Transistors 15, 25 and 35, provided to transmit signals from one load station to another station, are connected between the signal line 2 and ground. The bases of these transistors are connected to the corresponding ones of the remote control units 11, 21 and 31. The number of the selecting switches 14-1 through 14-n, 24-1 through 24-n or 34-1 through 34-n is such that any load in the entire system can be selected.

In the system constructed as described above, when it is desired, for instance, for the third load $L_{23}$ of the second load station 20 to be driven from the first load station 10, a selecting switch 14-23 (not shown) of the selecting device 14 which corresponds to address 23 of the load $L_{23}$ is switched on. It is also possible for each address selecting switch to be composed of a plurality of switches responding to two digits of a selected address. In this case, the address is selected by the combinaiion of those two switches.

Figure 3:
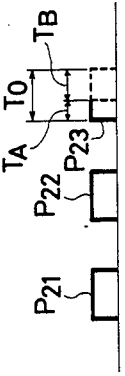
FIG. 3 is an expanded view of pulses of FIG. 2, specifically showing a partially cut-off pulse.

This operation causes the control unit 11 to produce a signal from its terminal (4) for the duration of the twenty-third pulse $P_{23}$ after each interval T (FIG. 2). Then, as shown in FIG. 3, the transistor 15 is rendered conductive during a period $T_B$ which follows a period $T_A$ from the leading edge of the twenty-third pulse, whose pulse duration is $T_o$, so that the signal line 2 is grounded to reduce a portion of each pulse $P_{23}$ to a low voltage level during the periods $T_B$. As a result, a pulse train having partially cut off pulses $P_{23}$ (FIG. 2) is transmitted over the signal line 2 to the load stations 20 and 30, where the pulses are detected by Schmitt triggers 23 and 33 and are counted by the remote control units 21 and 31.

The control unit 21 detects the partial absence of the pulses $P_{23}$ assigned to the unit 21 to thereby detect the selection of the third load $L_{23}$ of its own load station. In response, the control unit 21 produces a signal from its terminal (3) to cause the transistor 22-3 to conduct for supplying electric power to the load $L_{23}$. Other load stations will not detect the partially cut-off pulses, and hence they will not energize their loads.

A pulse having a pulse duration $T_o$ will be hereinafter called an OFF command, pulse, while a pulse whose pulse duration has been narrowed to $T_A = T_o - T_B$ will be called an ON command pulse.

The aforementioned operation is performed for every pulse burst (the bursts separated by intervals of T), and the load $L_{23}$ remains energized unless the switches 14-23 are turned off. When the switches 14-23 of the load station 10 are switched off, the transistor 15 is turned off when the twenty-third pulse $P_{23}$ arrives. The result is that the pulse $P_{23}$ appearing on the signal line 2 is returned to an OFF command pulse for the duration $T_o$. Thus, the control unit 21 sees no load of its station designated when it detects the twenty-third pulse $P_{23}$. Accordingly, the output signal from the terminal (3) is caused to cease driving the transistor 22-3. This stops the supply of electrcc power to the load $L_{23}$.

Figure 4:
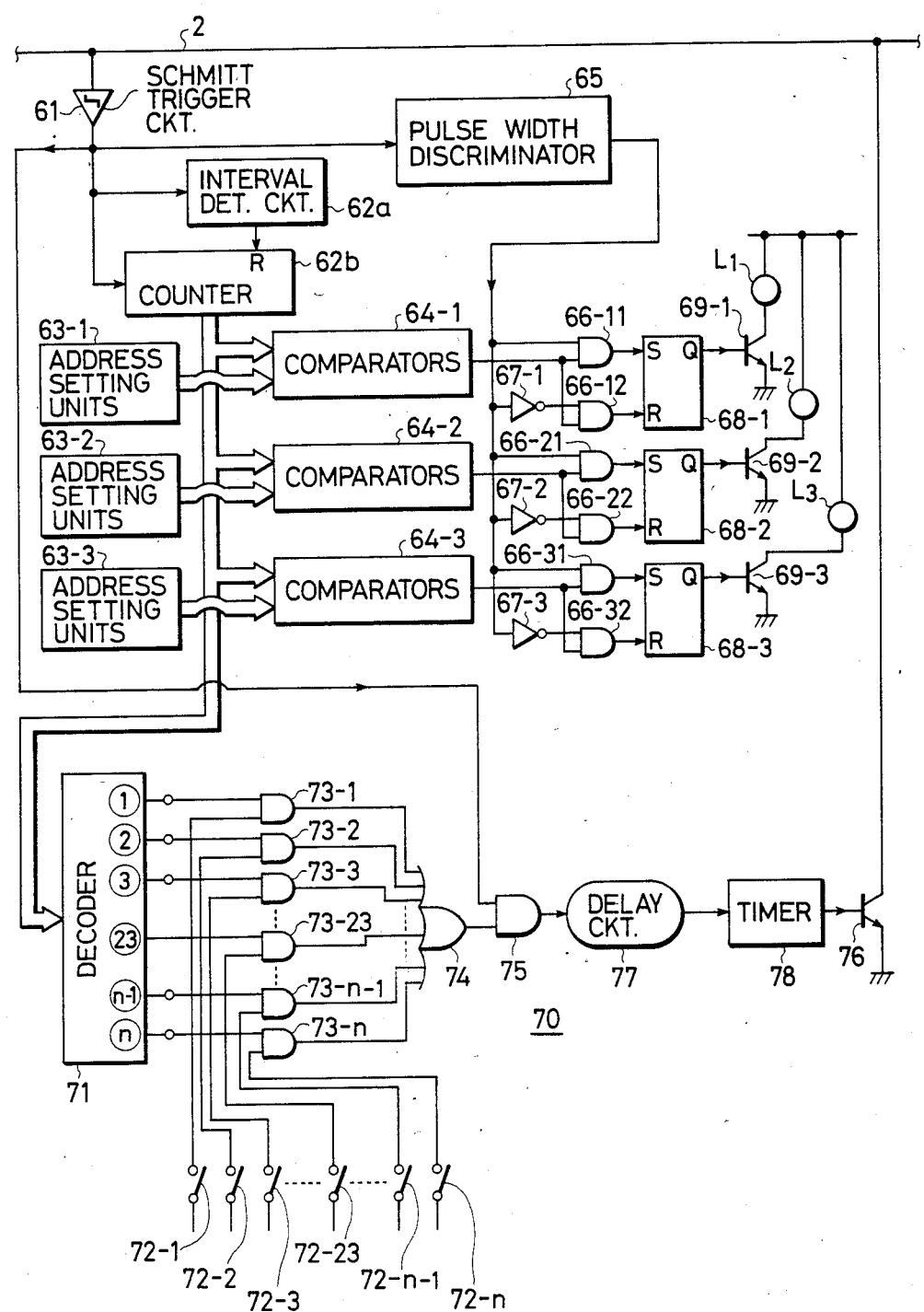
FIG. 4 is a circuit diagram of an example of a remote control unit used in the embodiment of FIG. 1.

FIG. 4 is a circuit diagram of one load station. The input of a Schmitt trigger 61, which responds with an output signal only to signals exceeding a certain level, is connected to the signal line 2. The Schmitt trigger 61 shapes the pulses received over the line 2 into a rectangular form and applies the shaped pulses to a counter 62, which counts the output pulses from the trigger 61 and supplies the count thereof to first input ports of each of the comparators 64-1, 64-2, etc. An interval detector circuit 62a detects the absence of pulses during each period between intervals T and delivers an output signal to reset the counter 62 accordingly.

Address setting units 63-1, 63-2 and 63-3 for loads $L_1$, $L_2$, ... within the station produce output signals which are applied to respective second input ports of the comparators 64-1, 64-2 and 64-3.

Figure 6:
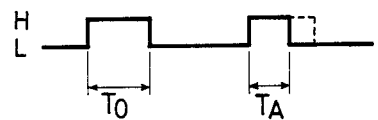
FIG. 6 is a waveform diagram showing pulses supplied to a signal line.

Each of the comparators 64-1, 64-2 and 64-3 compares the output signal from the respective address setting unit with the count provided by the counter 62 and produces an H-level output signal when the two are equal. The outputs of the comparators 64-1, 64-2 and 64-3 are connected to one input terminal of two respeovctive AND gates 66-11, 66-12, 66-21, 66-22, 66-31 and 66-32. The other input terminals of the AND gates 66-11, 66-21 and 66-31 are connected to the output terminal of a pulse-width discriminator 65, the input terminal of which is connected to the output of the Schmitt trigger 61. The other input terminals of the AND gates 66-12, 66-22 and 66-32 are connected to the discriminator 65 via inverters 67-1, 67-2 and 67-3, respectively. The discriminator 65 monitors the duration of the pulses of the output signal from the Schmitt trigger 61. When the output signal from the Schmitt trigger 61 is in the form of an OFF command pulse having a long pulse duration, such as pulses $P_{21}$ and $P_{22}$ in FIG. 3, the discriminator produces an L-level output signal, whereas when the output signal from the Schmitt trigger 61 has the form of an ON command pulse having a shorter pulse duration, such as the pulse $P_{23}$, the discriminator produces an H-level output signal. Hence, the discriminator 65 outputs an L level when it receives a pulse having a longer duration than $T_A$ and an H level when it receives a pulse shorter than pulse $T_A$ (See FIG. 6).

The outputs of the AND gates 66-11, 66-21 and 66-31 are connected to the setiinput terminals of flip-flops 68-1, 68-2 and 68-3, respectively, while the outputs of the AND gates 66-12, 66-22 and 66-32 are connected to the reset input terminals of flip-flops 68-1, 68-2 and 68-3, respectively. The flip-flops 68-1, 68-2 and 68-3 have set output terminals connected to the bases of transistors 69-1, 69-2 and 69-3, which control the energization of the loads $L_1$, $L_2$ and $L_3$, respectively.

A selecting device 70 instructs other stations to select a particular load. A decoder 71 produces an H output on one of its output terminals whose reference number corresponds to the count obtained by the counter 62. The output terminals of the decoder 71 are connected to first input terminals of corresponding AND gates 73-1 through 73-n, the second input terminals of which are connected to selecting switches 72-1, 72-2, ... 72-n. When one of the selecting switches, for example, switch 72-2, is on, if the decoder 71 produces a signal from its output terminal n, the AND gate 73-n will produce an H-level signal.

The output terminals of the AND gates 73-1 through 73-n are connected to the input terminals of an OR gate 74, the output terminal of which is connected to one input terminal of an AND gate 75, the other input terminal of which is connected to the output terminal of the Schmitt trigger 61. In the example above, the gate 75 provides a pulse signal in synchronization with the n-th pulse.

A delay circuit 77 produces an output signal after a delay of $T_A$ with respect to the input signal from the AND gate 75. The period $T_A$ is equal to the duration for which an ON command pulse is kept at a high level. The output of the delay circuit 77 is applied to a time 78, which begins the production of a pulse of duration $T_B$ when the output signal from the delay circuit 77 goes to the H state. The output of the timer 78 is connected to the base of a transistor 76, the collector of which is connected to the signal line 2. Accordingly, when the gate 75 delivers a pulse output, the timer 78 produces a pulse of duration $T_B$ after a period $T_A$, thus maintaining the transistor 76 conductive during the period $T_B$. This keeps the voltage on the signal line 2 at a low level during the priod $T_B$, cutting off the pulse during the period $T_B$, as shown in FIG. 3.

In cases where it is desired that the load $L_{23}$ of the load station 20 of FIG. 1 be remotely controlled from the first station 10, assuming that the selecting switch 72-23 corresponds to the load $L_{23}$, this switch will be switched on in the first station. Meanwhile, a pulse burst as shown in FIG. 2 is applied to the Schmitt trigger 61 from the signal line 2 between intervals of duration T. The trigger 61 shapes the pulses into a rectangular form for application to the counter 62, the output count of which becomes "1" subsequent to the arrival of the first pulse generated after the period T. The count becomes "2" subsequent to the arrival of the second pulse, etc.

Figure 5:
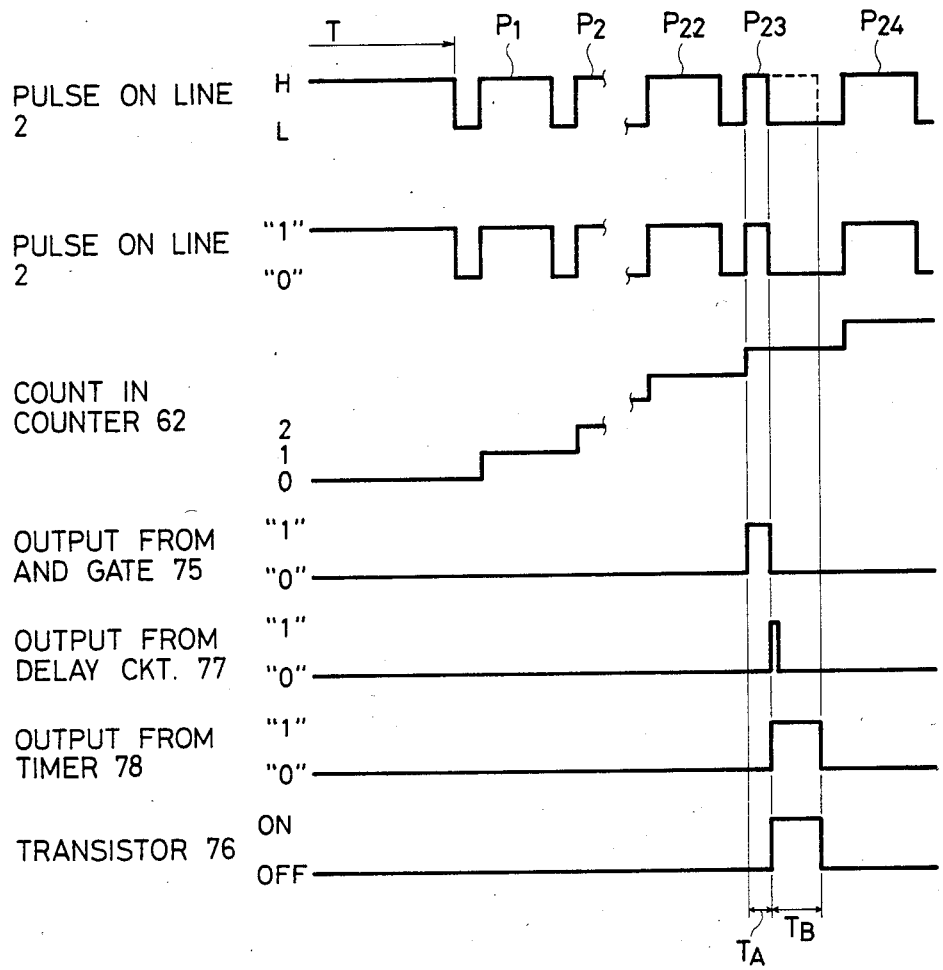
FIG. 5 is a waveform diagram used for illustrating the principle of operation of the apparatus of FIG. 4.

The count obtained by the counter 62 corresponding to the pulse $P_{23}$ is applied to the decoder 71. Then, when the output voltage at the terminal 23 of the decoder 71 goes to the H level, the output signal from the AND gate 73-23 also goes to the H level. This signal from the gate 73-23 is applied to a delay circuit 77 through an OR gate 74 and an AND gate 75. The delay circuit 77 produces a pulse after a delay of a period $T_A$, which then lasts for the duration of the pulse $P_{23}$, as shown in FIG. 5. This pulse causes a timer 78 to produce a pulse of duration $T_B$, which maintains a transistor 76 ccnductive during the period $T_B$. Thus, the signal line 2 is grounded the duration of the pulse $P_{23}$ to cut off the corresponding portion of the pulse $P_{23}$.

If the address setting unit 63-3 in the circuit of the load station 20, similar to the station of FIG. 4, corresponds to the pulse $P_{23}$, when the count output of the counter 62 reaches 23, the output signal from the comparator 64-3 assumes the H level. This signal is applied to the AND gate 66-31. Since a portion of the pulse $P_{23}$ is cut off, when the discriminator 65 receives the incomplete pulse $P_{23}$, it produces an H-level output. This causes the output signal from the AND gate 66-31 to assume the H level, thus setting the flip-flop 68-3. As such, the transistor 69-3 is turned on, whereby the load $L_{23}$ (load $L_3$ of FIG. 4) is energized For the duration of each complete pulse, other than for the duration of the pulse $P_{23}$, the output signal from the discriminator 65 assumes the L level, and therefore the output signals from the AND gates 66-11 and 66-21 are at the L level. Accordingly, the flip-flops 68-1 and 68-2 will not be set. On the other hand, as the output signals from the inverters 67-1 and 67-2 assume the H level, the output signals from the AND gates 66-12 and 66-22 assume the H Level for the respective duration. Thus, the flip-flops 68-1 and 68-2 remain reset. Also, the transistors 69-1 and 69-2 are maintained off, hhereby the loads $L_1$ and $L_2$ will not be energized.

In the intervals T of the pulses supplied to the signal line 2, an interval detector circuit 62a delivers an H level output signal to reset the counter 62, which restarts its counting operation from "1" upon application of the first pulse of the next cycle. Then, an operation similar to the foregoing is repeated, and the load $L_{23}$ (equivalent to load $L_3$ of FIG. 4) of the second station is maintained energized.

In the first station, when a selecting switch 72-23 is switched off, an AND gate 73-23 produces an L-level output signal, causing an OR gate 74 to produce an L-level output signal. The timer 78 is accordingly not operated, and thus the transistor 76 is turned off. Then, the partial cut-off of the pulses $P_{23}$ is stopped, and the duration of the pulses $P_{23}$ is restored to $T_o$.

As described in detail hereinbefore, in accordance with the present invention, a plurality of load stations are connected to a single signal line so that one station can communicate with other stations. Further, specific ones of bursts of pulses supplied to the signal line are partially cut off to effect control over device to be operated. Consequently, the devices to be controlled can be started or stopped simply by detecting the presence or absence of the cut-off portions of appropriately assigned pulses, thus requiring no complex multiplexing demultiplexing devices. Hence, an inexpensive remote control apparatus is provided.

I claim:

1. A remote control apparatus comprising:
    pulse generating means for generating periodic bursts of pulses, each of a first predetermined duration, with said bursts being separated by silent intervals of a second predetermined duration;
    a plurality of load stations, each of said load stations comprising at least one load, each said burst of pulses containing a number of pulses at least equal to a total number of loads among all said load stations; and
    a single signal line interconnecting said pulse generator and all said load stations;
    each of said load stations further comprising switching means for shortening said first predetermined duration of selected ones of said pulses to a third predetermined duration, means for selectively activating each load of said load station said burst, wherein each said load is activated when the corresponding pulse of said load is activated when the corresponding pulse of said burst has said third predetermined duration and deactivated when said corresponding pulse has said first predetermined duration;
    wherein said selective activating means comprises; counter means for counting the pulses of each said burst; a pulse width discriminator having an input coupled to said single signal line and producing an output in a first state in the presence of a pulse having said first predetermined duration and a second state in the presence of a pulse having said third predetermined duration; a comparator for each said load, said comparator having a first input port coupled to a count output of said counter; an address setting unit for each said load, said address setting unit being set to an address for its respective load corresponding to a sequential number of a corresponding pulse of each said burst, an output of said address setting unit being applied to a second input port of the respective comparator; and gating means operating in response to said output of said pulse width discriminator and an output of said comparator for controlling the activation of the respective load;
    said gating means comprising; an RS flip-flop, a first AND gate having a first input coupled to said output of said comparator and a second input coupled to said output of said pulse width disciriminator and output of said first AND gate being coupled to an S input of said flip-flop; a second AND gate having a first input coupled to said output of said comparator and an output coupled to an R input of said flip-flop; an inverter coupled between said output of said pulse width discriminator and a second input of said second AND gate; and a driver transistor having a collector-emitter circuit and base, said base being coupled to an output of said flip-flop, the respective load being coupled to said collector emitter circuit of said transistor.

2. The remote control apparatus of claim 1, further comprising: a Schmitt trigger circuit coupled between said single signal line and said input of said pulse width discriminator and a clock input of said counter means.

3. The remote control apparatus of claim 2, further comprising: an interval detector coupled between an output of said Schmitt trigger circuit and a reset input of said counter means for resetting said counter means in the presence of said silent intervals of said second predetermined duration.

4. The remote control apparatus of claim 2, wherein said switching means comprises: a decoder having an input coupled to said output of said counter; a plurality of switches; a plurality of third AND gates, each of which has a first input coupled to a corresponding output of said decoder and a second input coupled to a respective one of said switches; an OR gate having an input coupled to outputs of said third AND gates; a fourth AND gate having a first input coupled to an output of said OR gate and a second input coupled to an output of said Schmitt trigger circuit; a delay circuit having an input coupled to an output of said fourth AND gate; a timer circuit having an input coupled to an output of said delay circuit; and a switching transistor, responsive to an output of said timer circuit, coupled between said single signal line and a ground point.

* * * * *